(12) United States Patent
Vakhshoori et al.

(10) Patent No.: US 6,519,386 B1
(45) Date of Patent: Feb. 11, 2003

(54) LIGHT COUPLING APPARATUS AND METHOD

(75) Inventors: Daryoosh Vakhshoori, Cambridge, MA (US); Parviz Tayebati, Watertown, MA (US)

(73) Assignee: CoreTek, Inc., Wilmington, MA (US)

( * ) Notice: Subject to any disclaimer, the term of this patent is extended or adjusted under 35 U.S.C. 154(b) by 0 days.

(21) Appl. No.: 09/237,145

(22) Filed: Jan. 25, 1999

Related U.S. Application Data
(60) Provisional application No. 60/073,255, filed on Jan. 30, 1998.

(51) Int. Cl.[7] .................................................. G02B 6/26
(52) U.S. Cl. ......................................................... 385/31
(58) Field of Search ........................... 385/31, 123, 133; 313/344

(56) References Cited

U.S. PATENT DOCUMENTS

| | | | | |
|---|---|---|---|---|
| 2,426,255 A | * | 8/1947 | Widmaier | 313/309 |
| 2,441,824 A | * | 5/1948 | Kurlander | 313/111 |
| 5,530,940 A | * | 6/1996 | Ludwig, Jr. et al. | 385/31 |

* cited by examiner

Primary Examiner—John D. Lee
Assistant Examiner—Sarah N Song
(74) Attorney, Agent, or Firm—Pandiscio & Pandiscio, P.C.

(57) ABSTRACT

An apparatus and method for orienting a light source with individual or bundled, single- or multi-mode optical fibers so that the light source projects an efficient projection and/or an optimal projection toward at least one optical fiber.

16 Claims, 4 Drawing Sheets

LIGHT COUPLING APPARATUS AND METHOD

REFERENCE TO PENDING PRIOR PROVISIONAL PATENT APPLICATION

This patent application claims benefit of pending prior U.S. Provisional Patent Application Serial No. 60/073,255, filed Jan. 30, 1998 by Daryoosh Vakhshoori and Parviz Tayebati for FIBEROPTIC WHITE LIGHT SOURCE.

FIELD OF THE INVENTION

The invention relates to optical fiber light transmission. More specifically, the invention relates to orienting a light source and an optical fiber for optical fiber light transmission.

BACKGROUND OF THE INVENTION

Fiber optics is a branch of physics based on the transmission of light through transparent fibers. Individual or bundled optical fibers, each having a diameter measuring less than 0.00015 inch, can carry light for hundreds of miles. An optical fiber has a highly transparent core, typically constructed from glass or plastic and encased in a cladding. Light from a laser, incandescent light bulb or other source enters one end of the optical fiber. Light traveling through the core is contained by the cladding because the inside surface of the cladding bends or reflects light inwardly. At the other end of the fiber, a detector, such as a photosensitive device or the human eye, receives the light.

Optical fibers (including lensed fibers, graded index fibers and thermally expanded core fibers, among others, with or without integrated or otherwise associated optical elements) may be single- or multi-mode. Conventionally, single-mode fibers are used for long-distance transmissions.

A fiber has a core having an aperture with an acceptance angle. Referring to FIG. 1, an acceptance angle 26 is an angular measurement between opposed asymptotes 30 extending from an edge 23 of an aperture 22. Rotating the asymptotes 30 about the sight line 24 of the aperture 22 defines a conically-extending view field. From the perspective of the aperture 22, at a distance 34 from the aperture 22, the view field 32 appears as shown in dashed lines. Light 20 thrown from a light source 36 outside of a view field is not received in the aperture 22. View field size is a function of aperture size.

A small view field necessitates precise connections between a fiber and light source, other fibers in the system and any detector. Thus, fibers typically are coupled with a precision light source, such as laser light emitter. A lens L or curved mirror (not shown) sometimes is used to focus light on the aperture A of a fiber F, as shown in FIG. 2. However, these intervening light guides negatively impact on overall transmission efficiency. The added parts and assembly also undesirably increase the cost and timing required for coupling the light source and the optical fiber.

Often, single- and/or multi-mode fibers are bundled proximate to a light source and convey light received to diverse locations. In such cases, the light source and optical fibers must be oriented so that each fiber aperture receives a desired amount of light.

Finally, light sources often have anisotropic light throwing characteristics. For example, an incandescent light source, as shown in FIG. 3, may include a filament 42 formed into a coil 44 having an axis 46. The coil 44 projects a singular, ring-shaped projection having a particular luminescence, as viewed in the axial direction 48, or a series of rod shapes having a different luminescence, as viewed in the orthogonal direction 50. The light source projects optimal luminescence along an optimal projection line between the axial and orthogonal directions. Orienting the light source so that it projects optimal luminescence toward an optical fiber aperture yields optimal performance from the optical fiber.

The foregoing demonstrates a need for an apparatus and method for orienting any light source and any individual or bundle of optical fibers so that the light source projects optimal luminescence toward desired optical fiber apertures.

SUMMARY OF THE INVENTION

The invention is an apparatus and method for coupling a light source with individual or bundled, single- or multi-mode optical fibers. The invention eliminates the need for lenses and mirrors to focus light on an optical fiber aperture. Thus, the invention eliminates costly parts and assembly operations otherwise required. The invention also eliminates efficiency losses occasioned when a medium, such as a lens, is used to reflect or refract light towards the optical fiber. Further, the invention provides for obtaining optimal luminescence from an anisotropically-luminescent spatially incoherent light source.

An exposed portion of each optical fiber core forms an aperture with a sight line and an acceptance angle that defines a view field. Light thrown by a light source positioned outside of the view field is not received in the aperture. The invention orients a light source and individual or bundled optical fibers so that the light source is within a view field.

The invention also orients individual or bundled optical fibers and a light source with anisotropic light-throwing characteristics so that the light source projects an optimal projection toward an aperture for optimal luminescence.

These and other features of the invention will be appreciated more readily in view of the drawings and detailed description below.

BRIEF DESCRIPTION OF THE DRAWINGS

The invention is described in detail below with reference to the following drawings, throughout which similar reference characters denote corresponding features consistently, wherein.

DETAILED DESCRIPTION OF THE INVENTION

This patent application claims benefit of pending prior U.S. Provisional Patent Application Serial No. 60/073,255 filed Jan. 30, 1998 by Daryoosh Vakhshoori and Parviz Tayebati for FIBEROPTIC WHITE LIGHT SOURCE, which document is hereby incorporated herein by reference.

The invention is a simple, inexpensive light coupling apparatus and method for providing optimal luminescence from any light source to individual or bundled, single- or multi-mode optical fibers.

Figure 1:
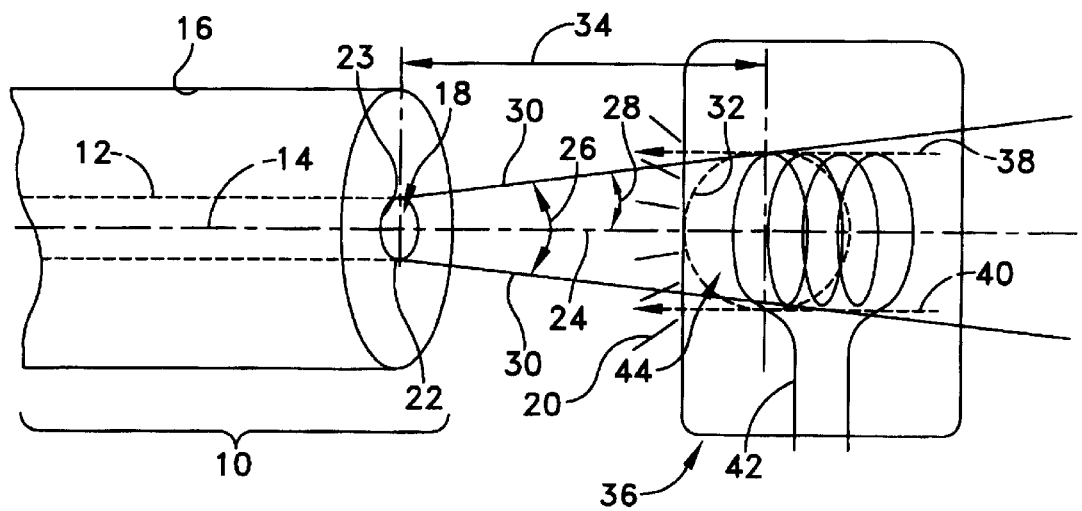
FIG. 1 is a side schematic representation of an optical fiber receiving light from a light source.
Figure 2:
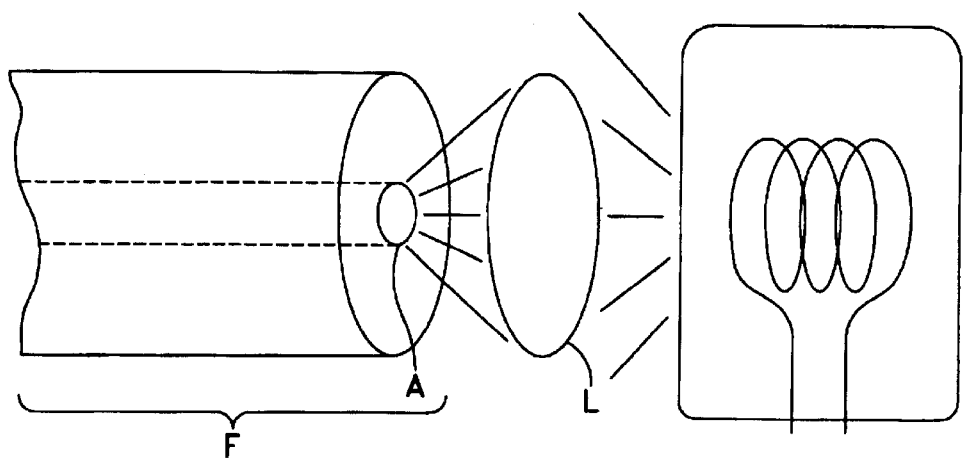
FIG. 2 is a schematic representation of an optical fiber receiving light from a light source focused through a lens.
Figure 3:
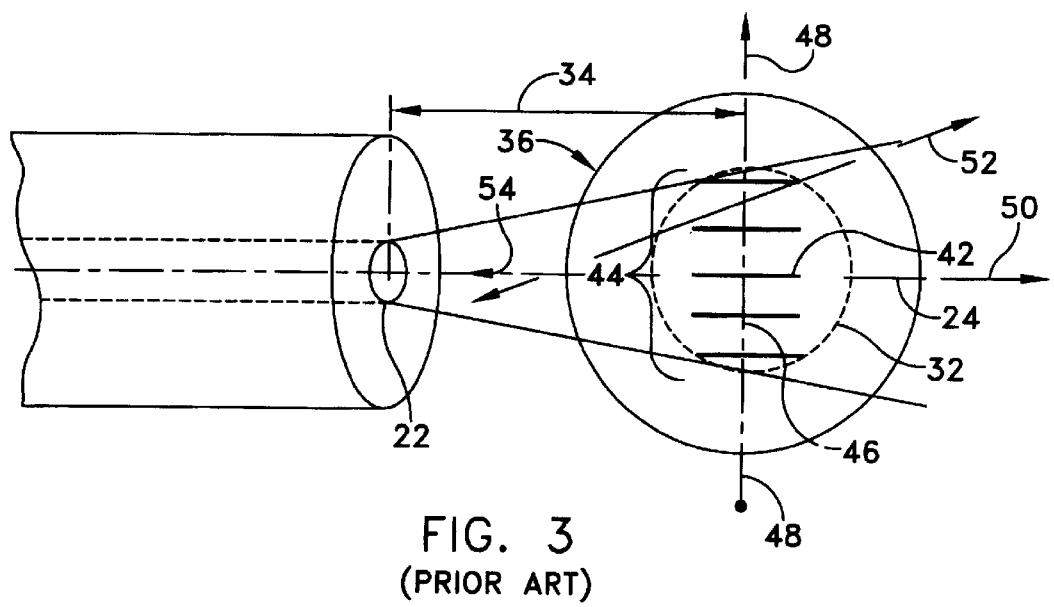
FIG. 3 is a top view of the embodiment of FIG. 1.

The invention is adaptable to any individual or bundle of optical fibers. Referring to FIGS. 1 and 3, an optical fiber 10 typically includes a core 12, having an axis 14, composed of glass, plastic or other material known in the art. The core 12 may be encased in cladding 16. A portion 18 of the core 12 is exposed from the cladding 16 and may receive light 20. Light 20 received in the core 12 is contained therein by the cladding 16. The cladding 16 reflects or refracts light 20 not traveling in alignment with the axis 14 back into the core 12.

The exposed portion 18 defines an aperture 22 with a sight line 24 and an acceptance angle 26, the angular measurement between opposed asymptotes 30 extending from an edge 23 of an aperture 22. Half of the acceptance angle 26 is referred to as a half angle 28. Rotating the asymptotes 30 about the sight line 24 of the aperture 22 defines a conical view field. The view field 32 shown in dashed lines represents the view field, from the perspective of the aperture 22, at a distance 34 from the aperture 22 along the sight line 24. Light 20 from a light source 36 inside of the view field is received in the aperture 22; light from a light source (not shown) outside of the view field is not received in the aperture 22.

Since light from a light source outside of the view field is not received in the aperture 22, light transmission through the optical fiber requires placement of the light source 36 in the view field 34. Maximum light transmission through an optical fiber occurs when a projection of a light source fills the entire view field. However, portions of the projection falling outside of the view field constitute waste. As shown, efficient projection occurs when the light source 36 projects a projection, defined between construction lines 38 and 40, that fills a maximum amount of the view field 32 without portions of the projection falling outside of the view field 32. This occurs when the projection of the light source 36 achieves a maximum amount of tangencies with the view field 32. The tangent of the half angle 28 suspended by the source seen from the core of the fiber equals to the numerical aperture of the fiber. The numerical aperture of typical single- and multi-mode fibers is 0.1–0.2, which is the tangent of the half angle of the far-field divergence.

Figure 4:
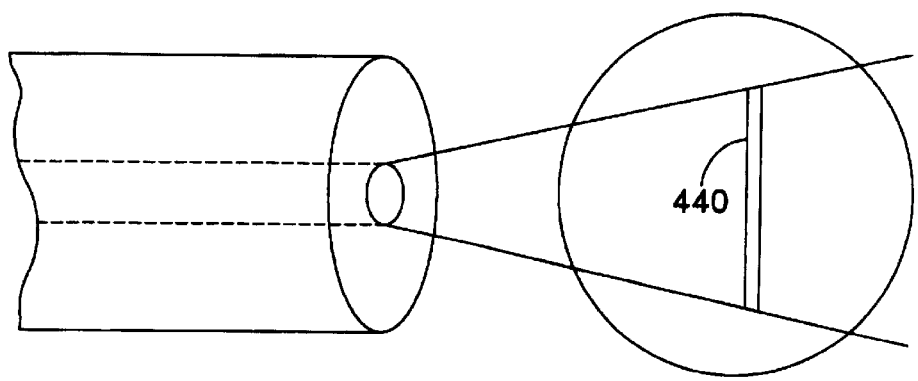
FIG. 4 is a plan schematic representation of an optical fiber receiving light from a light source with a sheet-shaped filament.
Figure 5:
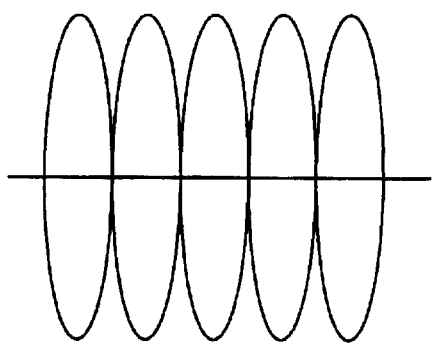
FIG. 5 is a schematic representation of a light source projection.

Although an incoherent light source may be positioned to throw an efficient projection, an anisotropically-luminescing light source may be positioned in another manner to maximize light thrown towards the aperture for optimal luminescence. For example, the light source 36 shown in FIGS. 1 and 3 has a filament 42, constructed from tungsten or other suitable material, formed into a coil 44 having an axis 46. The filament 42 also may be formed into a sheet 440, as shown in FIG. 4. Each filament, when energized, throws light having radially-dependant characteristics. In the case of a coil 44, for example, light thrown in an axial direction 48 has a different intensity than light thrown in an orthogonal direction 50 because the amount of light thrown by the ring-shaped axially-aligned projection is different than the amount thrown by the rod-shaped orthogonally-aligned projections. Optimal luminescence occurs along an optimal projection line 52 which falls between purely axial and orthogonal alignment. Optimal luminescence from the light source 36 is realized from aligning the optimal projection line 52 with the sight line 24. As shown in FIG. 5, an optimal projection provides a series of tangent ellipses which throw more light than a singular ring, as would be observed along the axial direction 48, or serial rod shapes, as would be observed along the orthogonal direction 50.

Figure 6:
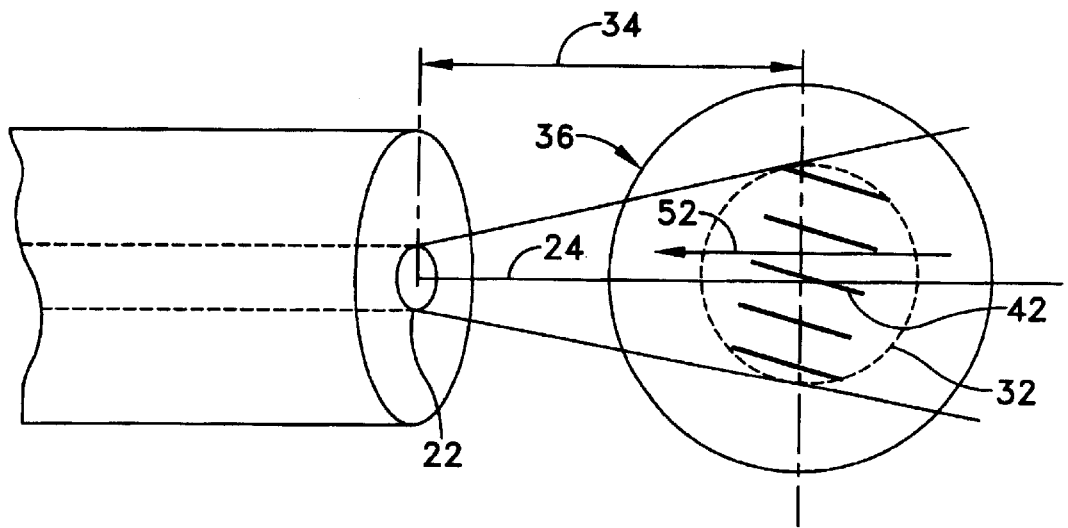
FIG. 6 is a plan schematic representation of an optical fiber receiving light from an optimally-oriented light source.

The invention harnesses the advantages of orienting a light source for optimal luminescence. Referring to FIG. 6, the light source 36 is oriented so that the coil 42 projects an optimal projection, commensurate with an optimal projection line 52, toward the aperture 22. Further, the light source 36 is located a distance 34 along the sight line 24 so that the optimal projection falls within the view field 32. The aperture 22 receives an efficient projection of optimal luminescence from the light source 36. Even if the optimal projection does not fall entirely within a view field, the optimal projection provides optimal luminescence from the light source as compared with other possible orientations for the light source relative to the aperture. Optimal luminescence is independent of efficient projection.

The invention also is suited to providing an efficient projection and/or optimal luminescence to multiple individual or bundled optical fibers. In the case where multiple individual optical fibers are used, the light source and each optical fiber are oriented so that the light source projects an efficient projection toward desired apertures. The optical fiber and light source orientation may be adjusted in a different manner so that the light source projects optimal luminescence toward desired apertures. The apertures receiving an efficient projection may be the same as or different from those receiving an optimal projection.

In the case where multiple optical fibers are bundled, the bundle has a bundle view field which is defined by the union of the view fields of the optical fibers in the bundle. For example, referring to FIG. 7, each fiber 110, 210 and 310, has an aperture 122, 222 and 322, with asymptotes 130, 230 and 330, defining view fields 132, 232 and 332, respectively, at a distance 34 from the apertures 122, 222 and 322. The bundle view field 58, at distance 34, in this instance, is defined by the snowman-shaped area bounded by the view fields 132, 232 and 332, including intersections thereof. In practice, the bundle view field may assume any shape. For efficient projection, the invention orients the light source 36 so that a projection of the light source 36 fills a maximum amount of the bundle view field 58 without portions of the light source falling outside of the bundle view field 58. The projection of the light source 36 achieves a maximum amount of tangencies with the view field 32. For optimal luminescence, the invention orients the light source 36 in a different manner so that the light source 36 projects an optimal projection toward the bundle for optimal luminescence.

Figure 7:
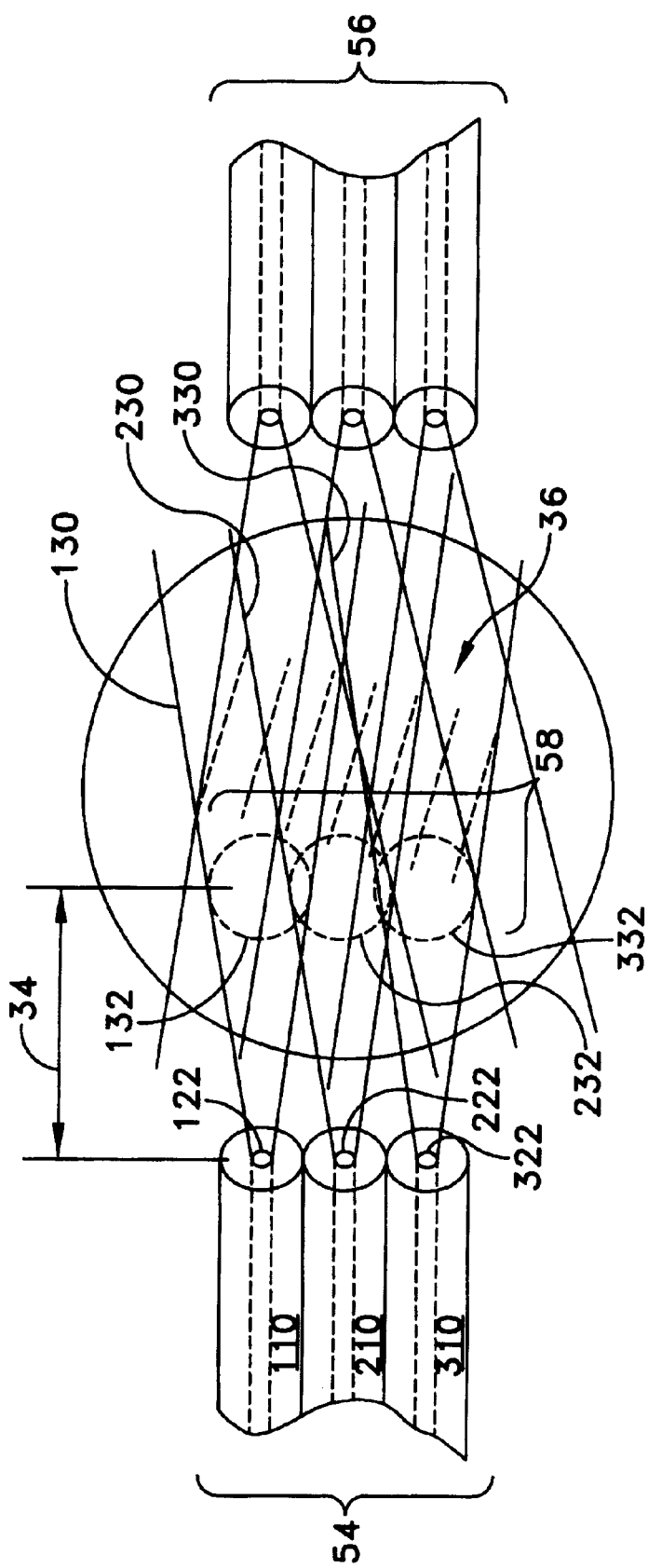
FIG. 7 is a plan schematic representation of multiple optical fibers receiving light from a light source.

In the case where multiple bundles are used with a single light source, as is shown in FIG. 7, the light source 36 and each bundle 54 and 56 are oriented so that the light source 36 projects an efficient projection toward desired apertures. The bundle and the light source orientation may be adjusted in a different manner so that the light source projects an optimal projection toward desired bundles for optimal luminescence.

The invention is not limited to the foregoing, but encompasses all improvements and substitutions consistent with the principles within the scope of the appended claims.

What is claimed is:

1. In combination, a light coupler, a light source, and an optical fiber including a core having an aperture with a view field, the coupler comprising:

means for orienting an optimal projection line of the light source and a sight line of the optical fiber so that the light source is within the view field, and so that the projection of the light source achieves a maximum amount of tangencies with the view field.

2. The combination of claim 1, said means orienting the light source and the optical fiber so that the light source projects a series of tangent ellipses which provide an optimal projection toward the aperture.

3. The combination of claim 1, the light source including a filament formed into a coil, said means orienting the coil and the optical fiber so that the coil projects a series of tangent ellipses which provide an optimal projection thereof toward the aperture.

4. The combination of claim 1, the light source including a filament formed into a sheet.

5. The combination of claim 4, said means orienting the sheet and the optical fiber so that the sheet projects a series of tangent ellipses which provide an optimal projection thereof toward the aperture.

6. The combination of claim 1, further including at least one additional optical fiber, each having an additional aperture with an additional view field;

said means orienting the light source and an additional optical fiber so that the light source is within an additional view field, and so that the projection of the light source achieves a maximum amount of tangencies with the additional view field.

7. The combination of claim 6, said means orienting the light source and an additional optical fiber so that the light source projects a series of tangent ellipses which provide an optimal projection toward the additional aperture.

8. The combination of claim 6, the optical fiber and the at least one additional optical fiber defining a bundle with a bundle view field;

said means orienting the light source and the bundle so that the light source is within the bundle view field.

9. The combination of claim 8, said means orienting the light source and the bundle so that the projection of the light source achieves a maximum amount of tangencies with the bundle view field.

10. The combination of claim 8, said means orienting the light source and the bundle so that the light source projects a series of tangent ellipses which provide an optimal projection toward the bundle.

11. In combination, a light coupler, a light source, and an optical fiber having an aperture, the coupler comprising:

means for orienting an optimal projection line of the light source and a sight line of the optical fiber so that the light source projects a series of tangent ellipses which provide an optimal projection toward the aperture.

12. The combination of claim 11, the light source including a filament formed into a coil, said means orienting the coil and the optical fiber so that the coil projects a series of tangent ellipses which provide an optimal projection thereof toward the aperture.

13. The combination of claim 11, the light source including a filament formed into a sheet, said means orienting the sheet and the optical fiber so that the sheet projects a series of tangent ellipses which provide an optimal projection thereof toward the aperture.

14. The combination of claim 11, further including at least one additional optical fiber, each having an additional aperture;

said means orienting the light source and an additional optical fiber so that the light source projects a series of tangent ellipses which provide an optimal projection toward the additional aperture.

15. A method for coupling a light source and an optical fiber comprising:

providing a light source and providing an optical fiber having an aperture with a view field; and positioning an optimal projection line of the light source and a sight line from the optical fiber so that the light source is within the view field, and so that the projection of the light source achieves a maximum amount of tangencies with the view field.

16. The method of claim 15, wherein said positioning induces the light source to project a series of tangent ellipses which provide an optimal projection toward the aperture.

\* \* \* \* \*